(12) United States Patent
Ueda et al.

(10) Patent No.: US 11,772,744 B2
(45) Date of Patent: Oct. 3, 2023

(54) CONTROL DEVICE OF GEAR TRANSMISSION-EQUIPPED VEHICLE AND METHOD OF CONTROLLING GEAR TRANSMISSION-EQUIPPED VEHICLE

(71) Applicant: KAWASAKI MOTORS, LTD., Akashi (JP)

(72) Inventors: Kengo Ueda, Akashi (JP); Hiroyuki Watanabe, Akashi (JP); Kazuki Arima, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 18/164,123

(22) Filed: Feb. 3, 2023

(65) Prior Publication Data

US 2023/0182863 A1 Jun. 15, 2023

Related U.S. Application Data

(62) Division of application No. 17/402,143, filed on Aug. 13, 2021, now Pat. No. 11,597,472.

(30) Foreign Application Priority Data

Oct. 12, 2020 (JP) .................................. 2020-171785

(51) Int. Cl.
*F16H 61/12* (2010.01)
*B62M 11/06* (2006.01)
(Continued)

(52) U.S. Cl.
CPC ............ *B62M 11/06* (2013.01); *B62M 25/08* (2013.01); *F16H 3/006* (2013.01); *F16H 59/46* (2013.01);
(Continued)

(58) Field of Classification Search
CPC ............... F16H 61/66272; F16H 61/12; F16H 2061/124; F16H 2061/1248; F16H 2061/1288
See application file for complete search history.

(56) References Cited

U.S. PATENT DOCUMENTS

| | | | |
|---|---|---|---|
| 5,043,894 A * | 8/1991 | Yamaguchi | ........... B60W 10/06 477/109 |
| 2004/0106498 A1* | 6/2004 | Badillo | ................. B60W 10/02 477/109 |

(Continued)

*Primary Examiner* — Edwin A Young
(74) *Attorney, Agent, or Firm* — Alleman Hall Creasman & Tuttle LLP

(57) ABSTRACT

A control device of a gear transmission-equipped vehicle includes a power controller that starts power reduction control when it is determined that a start condition is satisfied, the power reduction control being control of reducing power transmitted from a driving source to a gear transmission. The start condition includes: a condition that a detection value of a gear position sensor that detects a current gear position of the gear transmission falls within a transition region between engagement regions corresponding to respective gear positions; and a condition that a speed difference obtained by subtracting a rotational speed of an output shaft of the gear transmission from a rotational speed of an input shaft of the gear transmission is a threshold or more.

12 Claims, 7 Drawing Sheets

(51) Int. Cl.
  *F16H 61/688* (2006.01)
  *B62M 25/08* (2006.01)
  *F16H 63/18* (2006.01)
  *F16H 3/00* (2006.01)
  *F16H 61/662* (2006.01)
  *F16H 59/46* (2006.01)

(52) U.S. Cl.
  CPC ..... *F16H 61/66272* (2013.01); *F16H 61/688* (2013.01); *F16H 63/18* (2013.01)

(56) References Cited

U.S. PATENT DOCUMENTS

| | | | |
|---|---|---|---|
| 2006/0135314 A1* | 6/2006 | Shomura | B63H 20/20 |
| | | | 477/109 |
| 2011/0042158 A1* | 2/2011 | Portelance | B62K 5/05 |
| | | | 180/218 |
| 2015/0148186 A1* | 5/2015 | Uchida | B60W 10/11 |
| | | | 477/3 |
| 2015/0211625 A1* | 7/2015 | Fujii | F16H 59/02 |
| | | | 74/473.3 |
| 2018/0119806 A1* | 5/2018 | Armstead | F16H 61/0213 |

* cited by examiner

CONTROL DEVICE OF GEAR TRANSMISSION-EQUIPPED VEHICLE AND METHOD OF CONTROLLING GEAR TRANSMISSION-EQUIPPED VEHICLE

CROSS-REFERENCE TO RELATED APPLICATION

The present application is a divisional of U.S. patent application Ser. No. 17/402,143, filed Aug. 13, 2021, and entitled CONTROL DEVICE OF GEAR TRANSMISSION-EQUIPPED VEHICLE AND METHOD OF CONTROLLING GEAR TRANSMISSION-EQUIPPED VEHICLE, which in turn claims priority to Japanese Patent Application No. 2020-171785, filed on Oct. 12, 2020, the entire disclosures of which are hereby incorporated herein by reference for all purposes.

BACKGROUND OF THE INVENTION

Technical Field

The present disclosure relates to a control device of a gear transmission-equipped vehicle.

Description of the Related Art

An engine vehicle including a gear transmission is known (see Japanese Laid-Open Patent Application Publication No. 2019-85894, for example). In a gear transmission, when a shift drum rotates, and a shift fork slides a gear selector, the gear selector is engaged with a gear, and a speed change path of a desired change gear ratio becomes a power transmitting state.

However, when the engagement of the gear selector with the gear is incomplete at the time of the completion of a speed change operation, the gear selector may be unintentionally disengaged from the gear although next speed change manipulation is not being performed (gear disengagement). When the gear selector is disengaged from the gear, load applied from a road surface to a driving wheel is not transmitted to an engine, and a rotational speed of the engine increases sharply. Therefore, when the gear selector is reengaged with the gear after being disengaged from the gear, shock is generated due to a speed difference between the gear and the gear selector.

SUMMARY OF THE INVENTION

A control device of a gear transmission-equipped vehicle according to one aspect of the present disclosure is a control device of a gear transmission-equipped vehicle, the gear transmission-equipped vehicle including a driving source and a gear transmission that changes a rotational speed of power output from the driving source, the control device including: a condition determiner that determines whether or not a predetermined start condition is satisfied; and a power controller that starts power reduction control when the condition determiner determines that the start condition is satisfied, the power reduction control being control of reducing the power transmitted from the driving source to the gear transmission. The start condition includes: a condition that a detection value of a gear position sensor that detects a current gear position of the gear transmission falls within a transition region between engagement regions corresponding to respective gear positions; and a condition that a speed difference obtained by subtracting a rotational speed of an output shaft of the gear transmission from a rotational speed of an input shaft of the gear transmission is a threshold or more.

DESCRIPTION OF THE PREFERRED EMBODIMENTS

Hereinafter, embodiments will be described with reference to the drawings.

Figure 1:
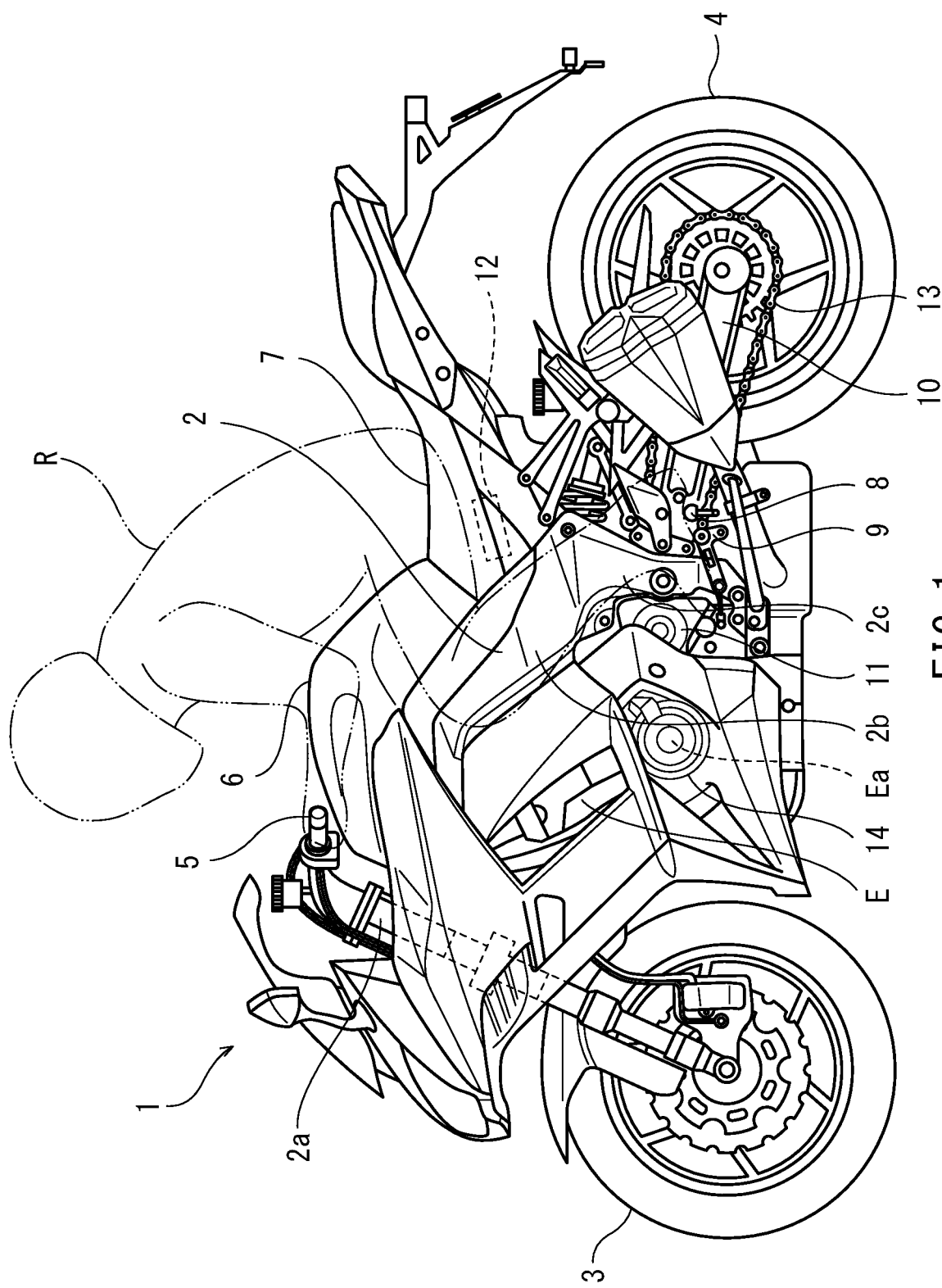
FIG. 1 is a left side view of a motorcycle.

FIG. 1 is a left side view of a motorcycle 1. As shown in FIG. 1, the motorcycle 1 includes a vehicle body frame 2 and front and rear wheels 3 and 4 supported by the vehicle body frame 2. The front wheel 3 is a driven wheel, and the rear wheel 4 is a driving wheel. The motorcycle 1 is one example of a gear transmission-equipped vehicle. The gear transmission-equipped vehicle is not limited to a motorcycle and may be a different type of vehicle (for example, a straddle vehicle, such as a three-wheeled motorcycle).

The vehicle body frame 2 includes a head pipe 2a, a main frame 2b, and a pivot frame 2c. The main frame 2b extends rearward from the head pipe 2a. The pivot frame 2c is connected to a rear portion of the main frame 2b. The head pipe 2a supports a steering shaft such that the steering shaft is rotatable. The steering shaft is connected to a bar handle 5 held by a rider R. The front wheel 3 is steered to a left direction or a right direction by the rotation of the steering shaft.

A fuel tank 6 is arranged behind the handle 5 and at an upper side of the main frame 2b. A seat 7 on which the rider R is seated is arranged behind the fuel tank 6. Steps 8 on which the rider R places his/her feet are arranged under and at left and right sides of the seat 7. A shift operating body 9 (shift lever) is arranged close to one of the steps 8 and is manipulated by the foot placed on the step 8. A front end portion of a swing arm 10 is supported by the pivot frame 2c, and the rear wheel 4 is supported by a rear end portion of the swing arm 10.

An engine E (driving source) supported by the main frame 2b and the pivot frame 2c is arranged between the front wheel 3 and the rear wheel 4. The engine E is an internal combustion engine as a driving source that generates traveling power. Instead of the engine E, an electric motor may be used as the driving source. Or, both the engine and the electric motor may be used as the driving sources.

A gear transmission 11 is connected to a crank shaft Ea of the engine E such that the crank shaft Ea of the engine E can transmit the power to the gear transmission 11. Driving force output from the gear transmission 11 is transmitted to the rear wheel 4 through a power transmitting structure 13 (for example, a chain or a belt). The crank shaft Ea of the engine E is housed in a crank case 14 supported by the vehicle body frame 2. The crank case 14 also houses the gear transmission 11, i.e., also serves as a transmission case. The motorcycle 1 is equipped with a control device 12 (ECU) that controls the engine E.

Figure 2:
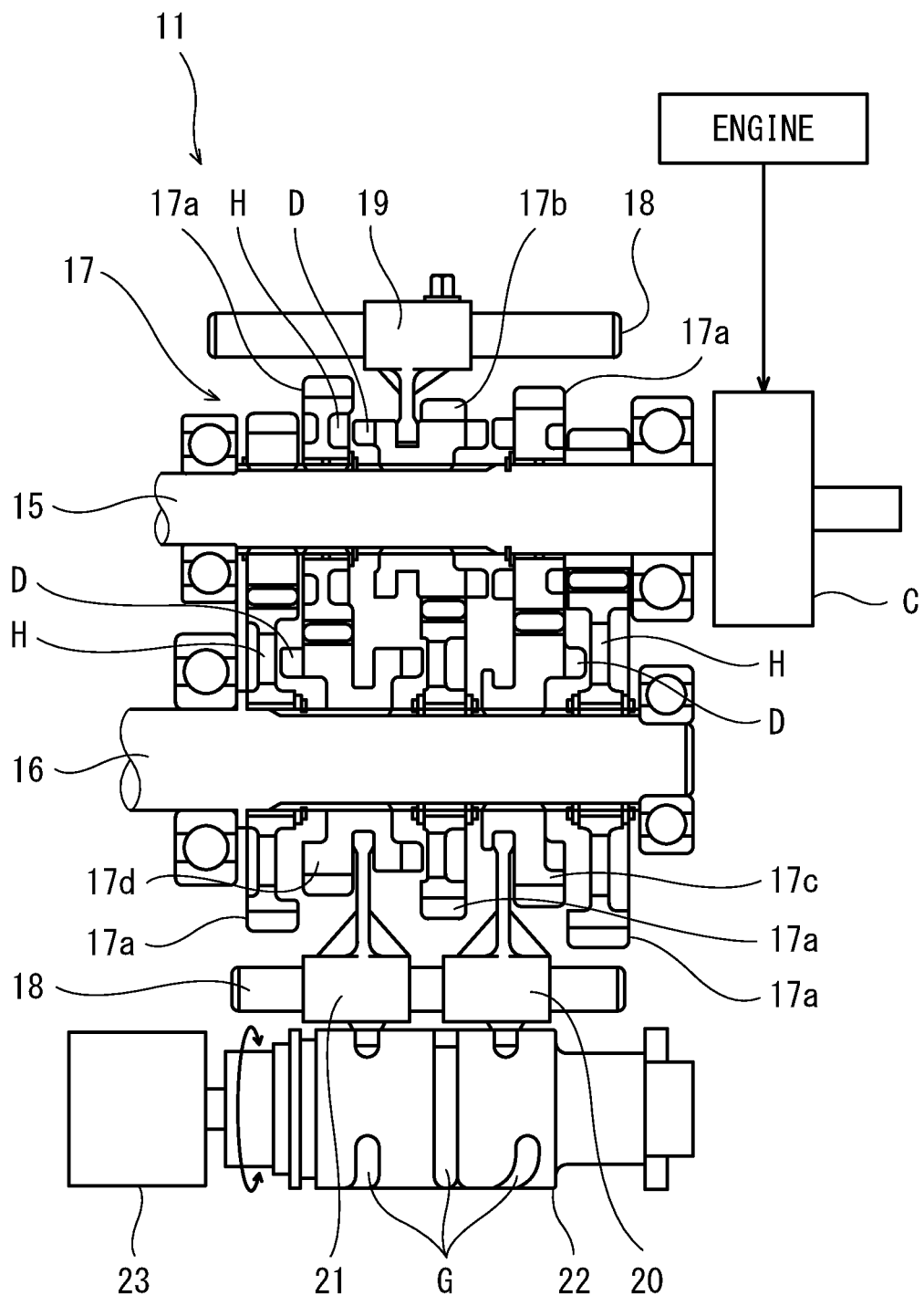
FIG. 2 is a sectional view taken along a plane passing through respective shafts of a gear transmission of the motorcycle shown in FIG. 1.

FIG. 2 is a sectional view taken along a plane passing through respective shafts of the gear transmission 11 of the motorcycle 1 shows in FIG. 1. As shown in FIG. 2, the gear transmission 11 includes an input shaft 15, an output shaft 16, and transmission gear pairs 17 that have different reduction ratios from each other. The gear transmission 11 can selectively set a desired one of the transmission gear pairs 17 to a power transmitting state to change the rotational speed of the power transmitted from the input shaft 15 to the output shaft 16. The power is transmitted from the crank shaft Ea of the engine E to the input shaft 15 of the gear transmission 11. The power transmitting structure 13 (see FIG. 1) that transmits the power of the output shaft 16 to the rear wheel 4 is engaged with the output shaft 16.

A main clutch C is interposed between the engine E and the input shaft 15. To be specific, a power transmitting path from the engine E to the gear transmission 11 can be cut by the main clutch C. The main clutch C is a friction clutch (for example, a multiple disc clutch) and can realize a half-engaged state. To be specific, the main clutch C can continuously change a power transmitting ratio between a disengaged state and a completely engaged state.

The gear transmission 11 is a dog gear transmission. The gear transmission 11 selects one of the transmission gear pairs 17 by mechanical connection with the manipulation of the rider to switch the power transmitting path, i.e., perform speed change. The gear transmission 11 includes gears 17a, dog gears 17b to 17d (engaging members), shift forks 19 to 21, and a shift drum 22. Each of the gears 17a is fitted to the input shaft 15 or the output shaft 16 so as to be rotatable relative to the input shaft 15 or the output shaft 16. Each of the dog gears 17b to 17d is fitted to the input shaft 15 or the output shaft 16 so as to rotate together with the input shaft 15 or the output shaft 16.

The gear 17a includes a dog hole H on a side surface thereof. Each of the dog gears 17b to 17d includes a dog D projecting from a side surface thereof toward the adjacent gear 17a. The dog gear 17b is disposed at the input shaft 15 so as to be slidable relative to the input shaft 15. The dog gears 17c and 17d are disposed at the output shaft 16 so as to be slidable relative to the output shaft 16. However, the gears 17a may include the dogs D, and the dog gears 17b to 17d may include the dog holes H.

The shift forks 19 to 21 are supported by spindles 18 so as to be slidable relative to the spindles 18. The spindles 18 are disposed in parallel with the input shaft 15 and the output shaft 16. A tip portion of the shift fork 19 is connected to the dog gear 17b of the input shaft 15. Tip portions of the shift forks 20 and 21 are respectively connected to the dog gears 17c and 17d of the output shaft 16. Base portions of the shift forks 19 to 21 are fitted to respective guide grooves G on an outer peripheral surface of the shift drum 22.

The shift drum 22 rotates by mechanical connection with shift manipulation of the shift operating body 9 (see FIG. 1) manipulated by the rider R. The shift drum 22 may be driven by an actuator to rotate. The shift forks 19 to 21 guided by the guide grooves G of the rotating shift drum 22 slide the corresponding dog gears 17b to 17d along the input shaft 15 or the output shaft 16.

With this, the dog D of any of the dog gears 17b to 17d is engaged with the dog hole H of any of the gears 17a. As a result, the transmission gear pair 17 having the reduction ratio desired by the rider R among the transmission gear pairs 17 becomes the power transmitting state. Thus, the power transmitting path of a desired gear stage is selected. To be specific, each of the dog gears 17b to 17d serves as a gear selector that is selectively engaged with a desired one of the gears 17a to realize the desired gear stage. In the present embodiment, the gear selector that is slid by the shift fork is the dog gear. However, instead of the dog gear, a dog that is not a gear may be used as the gear selector.

A gear position sensor 23 is engaged with the shift drum 22. The gear position sensor 23 outputs a detection value (voltage) corresponding to a phase angle (rotation angle) of the shift drum 22. Since the phase angle of the shift drum 22 corresponds to a current gear stage of the gear transmission 11, the detection value of the gear position sensor 23 indicates the current gear stage of the gear transmission 11.

Figure 3:
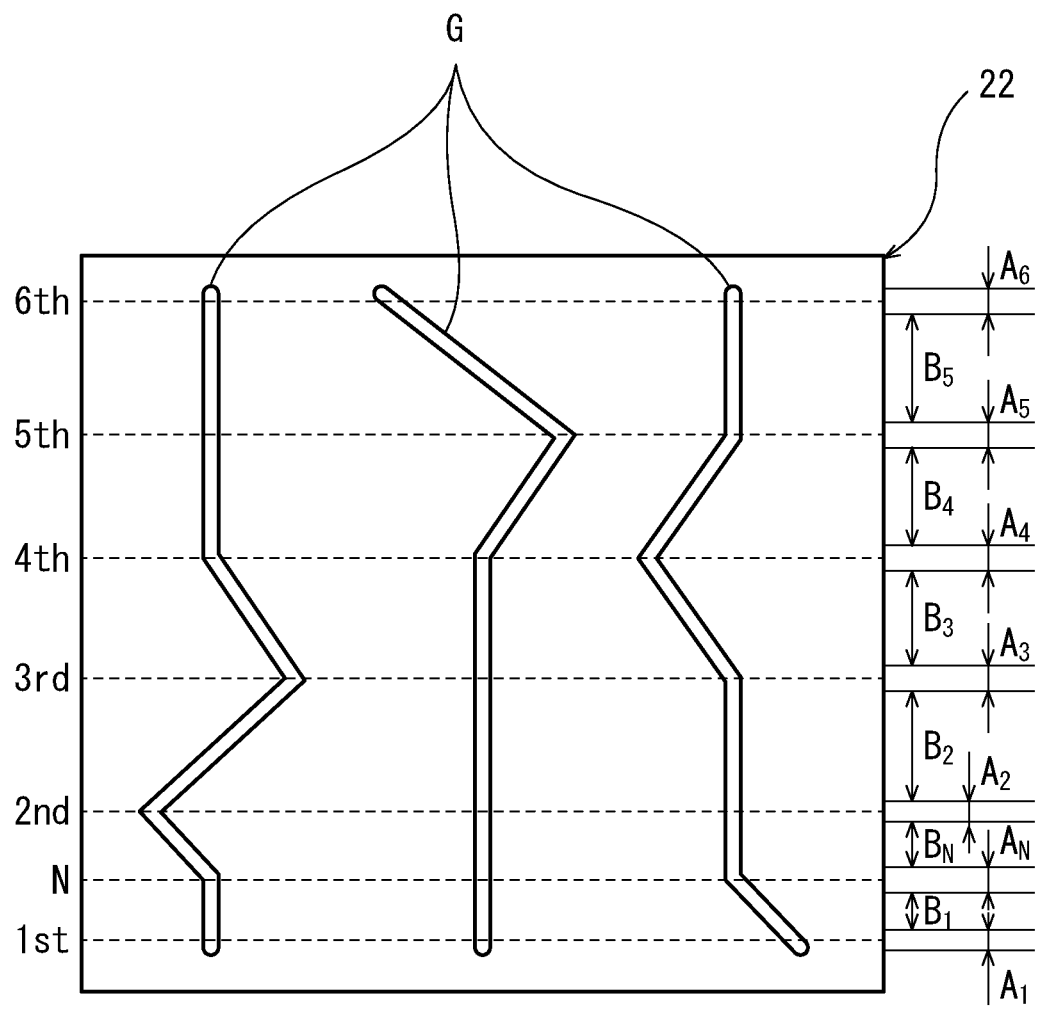
FIG. 3 is a development view of a shift drum shown in FIG. 2.

FIG. 3 is a development view of the shift drum 22 shown in FIG. 2. As shown in FIG. 3, each of the guide grooves G of the shift drum 22 includes engagement regions $A_1$ to $A_6$ corresponding to respective gear stages (for example, first to sixth speeds). When the shift forks 19 to 21 (see FIG. 2) are located in any of the engagement regions $A_1$ and $A_6$ of the guide grooves G of the shift drum 22, the dog D of any of the dog gears 17b to 17d (see FIG. 2) is engaged with the dog hole H of any of the gears 17a (see FIG. 2). Each of neutral regions $A_N$ is between the engagement region $A_1$ corresponding to the first speed and the engagement region $A_2$ corresponding to the second speed. When the shift forks 19 to 21 are located in the corresponding neutral regions $A_N$, the dogs D of the dog gears 17b to 17d are not engaged with the dog holes H of the gears 17a.

Each of the guide grooves G of the shift drum 22 includes transition regions $B_1$ to $B_5$ each located between adjacent two of the engagement regions $A_1$ and $A_6$. When the shift forks 19 to 21 are located in any of the transition regions $B_1$ to $B_5$ of the guide grooves G of the shift drum 22, the dogs D of the dog gears 17b to 17d are not engaged with the dog holes H of the gears 17a. To be specific, when the shift forks 19 to 21 are located in any of the transition regions $B_1$ to $B_5$ of the guide grooves G of the shift drum 22, the power transmitting path between the input shaft 15 and the output shaft 16 is cut, and load transmitted from a road surface through the rear wheel 4 to the gear transmission 11 is not transmitted to the engine E. Each of the transition regions $B_1$ is between the neutral region $A_N$ and the engagement region $A_1$, and each of the transition regions $B_N$ is between the neutral region $A_N$ and the engagement region $A_2$. When each of the shift forks 19 to 21 is located in the corresponding continuous regions $B_1$, $A_N$, and $B_N$, the dogs D of the dog gears 17b to 17d are not engaged with the dog holes H of the gears 17a.

In a speed change operation, each of the shift forks 19 to 21 moves from the current engagement region (one of the engagement regions $A_1$ and $A_6$) through the adjacent transition region (one of the transition regions $B_1$ to $B_5$) to the next engagement region (another one of the engagement regions $A_1$ and $A_6$). When each of the shift forks 19 to 21 moves from the current engagement region to the transition region, the dog D is disengaged from the dog hole H. When each of the shift forks 19 to 21 moves from the transition region to the next engagement region, the dog D is engaged with the dog hole H. Thus, the speed change operation is completed.

When the engagement of the dog D of the dog gear 17b, 17c, or 17d with the dog hole H of the gear 17a is incomplete after the completion of the speed change operation, the dog D may be unintentionally disengaged from the dog hole H although the next speed change operation is not being performed. When such unintentional gear disengagement (gear slipout; jump out of gear) occurs, each of the shift forks 19 to 21 moves from the engagement region (one of the engagement regions $A_1$ and $A_6$) to the transition region (one of the transition regions $B_1$ to $B_5$) in accordance with the movement of the dog gear (one of the dog gears 17b to 17d). When such gear disengagement occurs, the load applied from the road surface to the rear wheel 4 is not transmitted to the engine E, and the rotational speed of the engine E increases sharply. A state where the shift forks 19 to 21 are located in the neutral regions $A_N$ corresponds to a state where the dogs D are intentionally disengaged from the dog holes H. Therefore, this is not the gear disengagement in the present embodiment.

Embodiment 1

Figure 4:
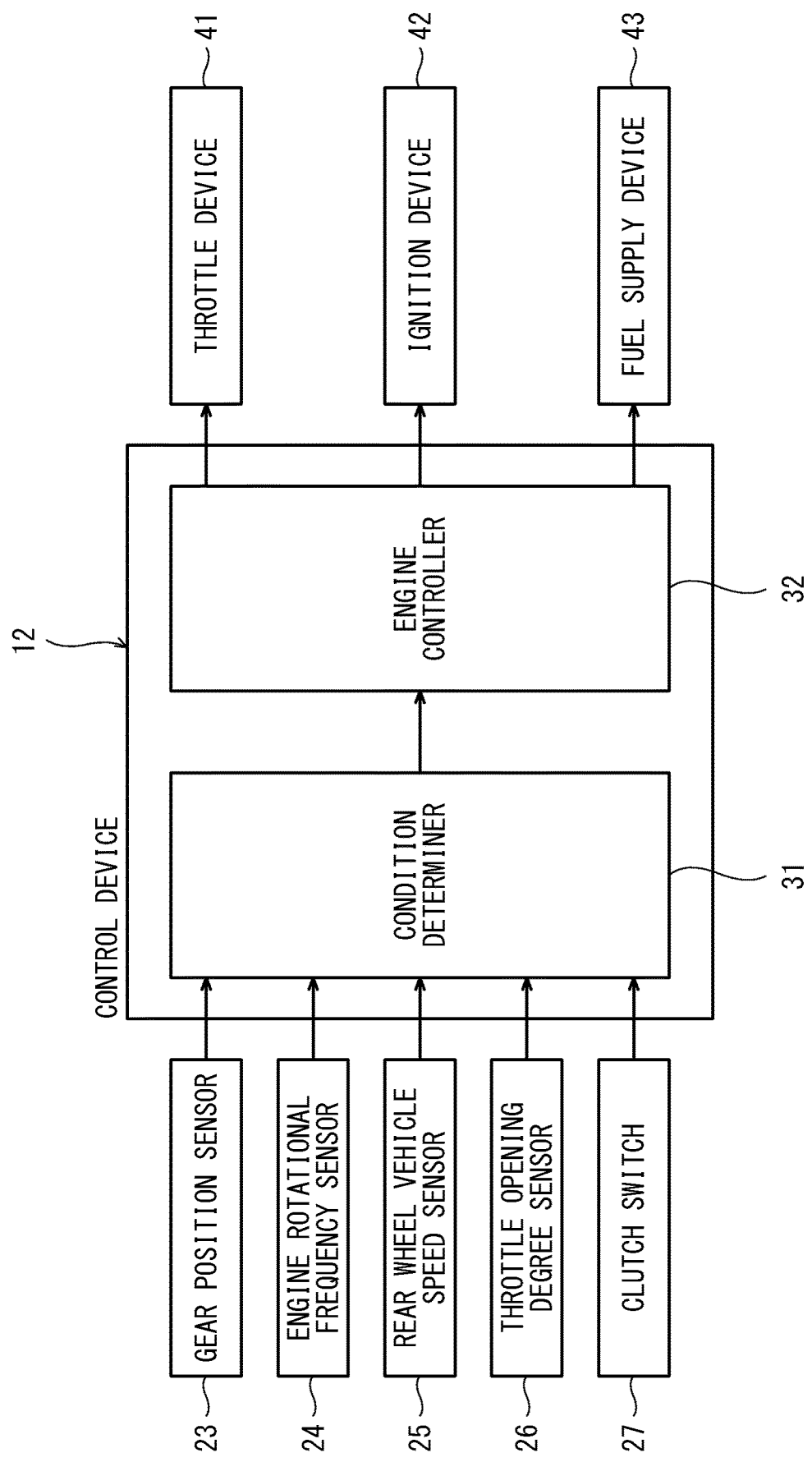
FIG. 4 is a block diagram showing a control device and the like according to Embodiment 1.

FIG. 4 is a block diagram showing the control device 12 and the like according to Embodiment 1. As shown in FIG. 4, the control device 12 includes a condition determiner 31 and an engine controller 32 (power controller) in terms of functions. The control device 12 includes a processor, a memory, an I/O interface, and the like in terms of hardware. The memory includes a storage (a hard disk, a flash memory, etc.) and a main memory (RAM). Each of the condition determiner 31 and the engine controller 32 is realized in such a manner that the processor utilizes the main memory to perform calculation processing based on a program stored in the storage.

The gear position sensor 23, an engine rotational frequency sensor 24, a rear wheel vehicle speed sensor 25, a throttle opening degree sensor 26, a clutch switch 27, and the like are electrically connected to an input side of the control device 12. A throttle device 41, an ignition device 42, a fuel supply device 43, and the like are electrically connected to an output side of the control device 12.

The gear position sensor 23 outputs the detection value (voltage) corresponding to the phase angle of the shift drum 22 to indicate the current gear stage of the gear transmission 11. The engine rotational frequency sensor 24 detects the rotational speed of the engine E. The rear wheel vehicle speed sensor 25 detects the rotational speed of the rear wheel 4. The throttle opening degree sensor 26 detects a throttle opening degree of a throttle valve of the throttle device 41. The clutch switch 27 detects whether the main clutch C is in an engaged state or a disengaged state.

The throttle device 41 adjusts the amount of intake air supplied to the engine E. The ignition device 42 ignites a fuel-air mixture in a combustion chamber of the engine E and can adjust an ignition timing. The fuel supply device 43 supplies fuel to the engine E and can adjust the amount of fuel supplied. To be specific, the engine E is controlled by controlling at least one of the throttle device 41, the ignition device 42, and the fuel supply device 43.

The condition determiner 31 determines a condition of executing power reduction control of suppressing a sharp increase in engine rotational speed at the time of the occurrence of the gear disengagement. Specifically, the condition determiner 31 determines whether or not a start condition of starting the power reduction control is satisfied during the operation of the engine E. The condition determiner 31 determines whether or not a termination condition of terminating the power reduction control is satisfied during the execution of the power reduction control.

When it is determined that the start condition is satisfied, the engine controller 32 starts the power reduction control of reducing the power transmitted from the engine E to the gear transmission 11. The power reduction control in the present embodiment is control of reducing the output of the engine E. Specifically, the power reduction control includes: controlling the throttle device 41 to reduce the amount of intake air; controlling the ignition device 42 to retard the ignition timing or not to perform ignition; and/or controlling the fuel supply device 43 to reduce the amount of fuel supplied.

Figure 5:
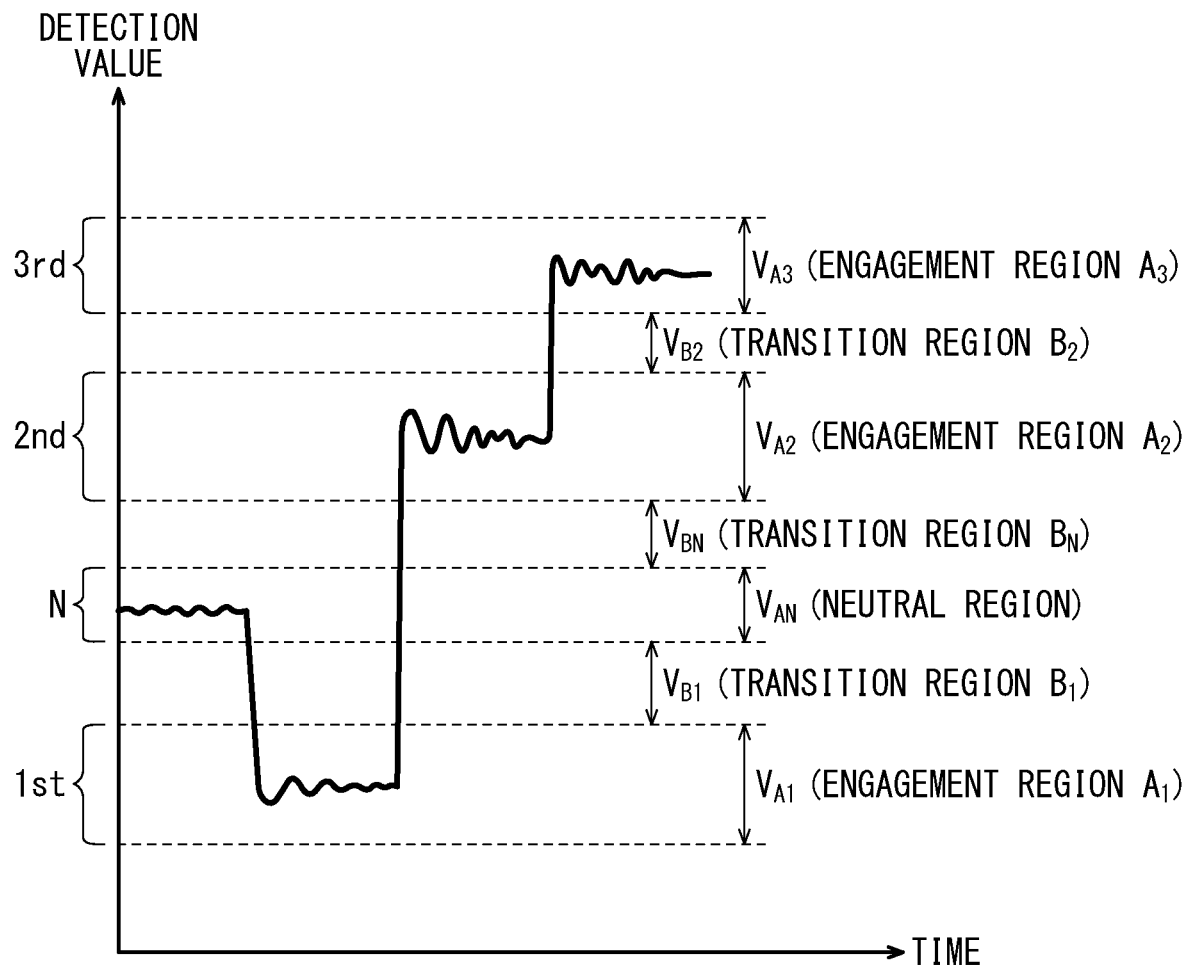
FIG. 5 is a graph showing detection values of a gear position sensor shown in FIG. 4.

FIG. 5 is a graph showing the detection values of the gear position sensor 23 shown in FIG. 4. As shown in FIG. 5, the detection values of the gear position sensor 23 indicate the positions of the shift forks 19 to 21 in the guide grooves G of the shift drum 22. In FIG. 5, a detection value range $V_{A1}$ corresponds to the engagement region $A_1$, a detection value range $V_{B1}$ corresponds to the transition region $B_1$, a detection value range $V_{AN}$ corresponds to the neutral region $A_N$, a detection value range $V_{BN}$ corresponds to the transition region $B_N$, a detection value range $V_{A2}$ corresponds to the engagement region $A_2$, a detection value range $V_{B2}$ corresponds to the transition region $B_2$, and a detection value range $V_{A3}$ corresponds to the engagement region $A_3$. To be specific, the condition determiner 31 (see FIG. 4) can find the region in which the shift forks 19 to 21 are located among the engagement regions $A_1$ and $A_6$, the transition regions $B_1$ to $B_5$ and $B_N$, and the neutral region $A_N$ by confirming the detection value region within which the detection value of the gear position sensor 23 falls.

Figure 6:
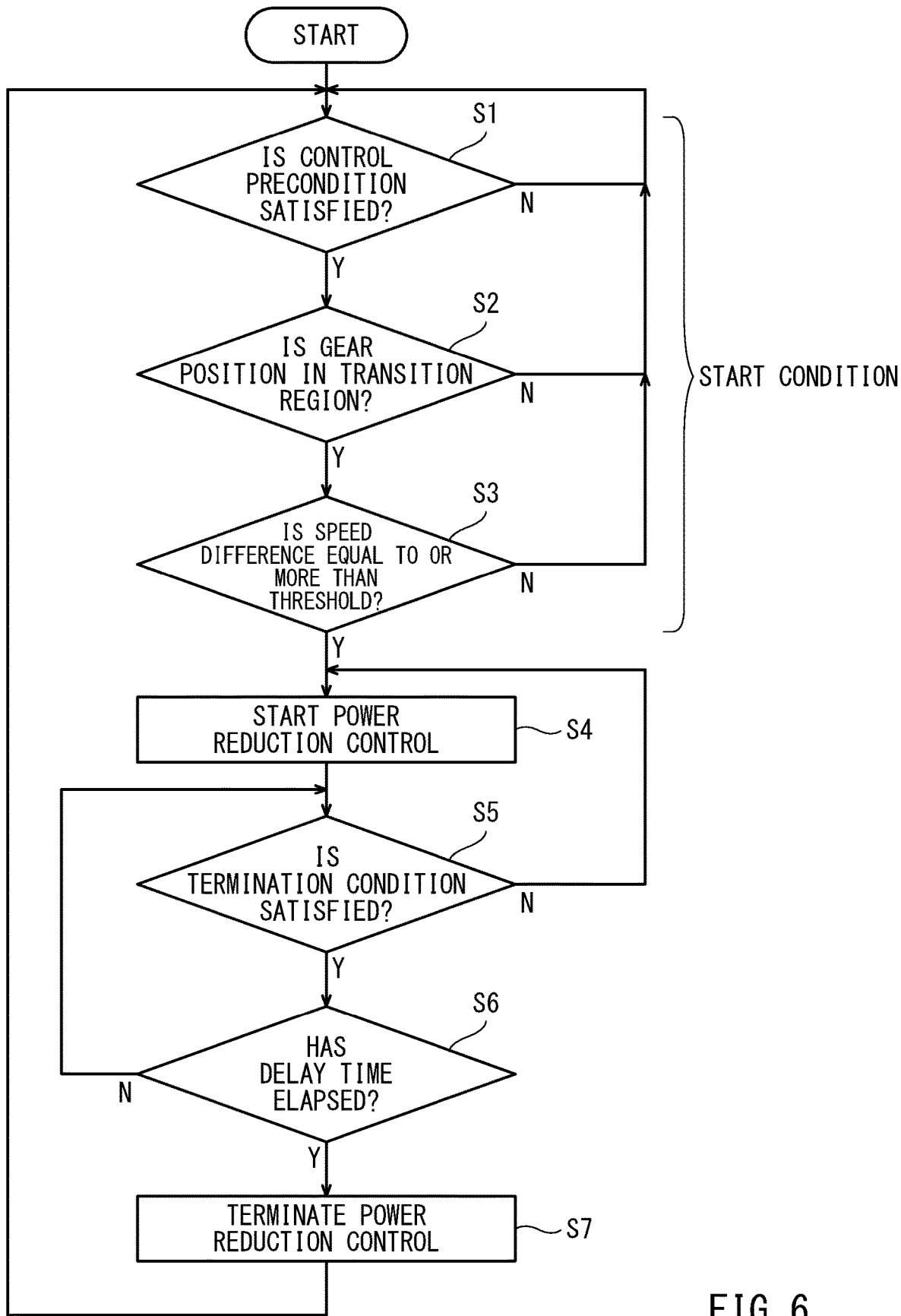
FIG. 6 is a flow chart for explaining control of the control device shown in FIG. 4.

FIG. 6 is a flow chart for explaining control of the control device 12 shown in FIG. 4. The following will be descried based on the flow chart of FIG. 6 with suitable reference to FIGS. 2 to 4. The condition determiner 31 of the control device 12 determines whether or not the start condition of starting the power reduction control is satisfied during the operation of the engine E. In other words, the condition determiner 31 determines whether or not the gear disengagement is being caused. The start condition includes conditions of Steps S1 to S3. Specifically, the condition determiner 31 first determines whether or not a control precondition is satisfied (Step S1).

When the control precondition is not satisfied (No in Step S1), the control device 12 returns to Step S1. The control precondition includes a condition that the main clutch C is in the engaged state. To be specific, even when the engine rotational speed increases with the main clutch C in the disengaged state, the rotational speed of the input shaft 15 of the gear transmission 11 does not increase. Therefore, by eliminating the disengaged state of the main clutch C from the start condition, the power reduction control is prevented from being executed unnecessarily.

The control precondition further includes a condition that the detection value of the gear position sensor 23 falls within a region (non-neutral region) other than the neutral region $A_N$. To be specific, the state where the shift forks 19 to 21 are located at the neutral regions $A_N$ (not the transition regions) corresponds to the state where the rider has intentionally caused the gear disengagement. Therefore, by eliminating the neutral region $A_N$ from the start condition, the power reduction control is prevented from being executed unnecessarily.

The control precondition further includes a condition that the magnitude of the power transmitted from the engine E to the gear transmission 11 is a predetermined lower limit or more. More specifically, the control precondition includes: a condition that the engine rotational speed is a predetermined lower limit or more; and a condition that the throttle opening degree is a predetermined lower limit or more.

With this, since the power reduction control is not executed when the engine rotational speed is low, jerky feeling is prevented from being given to the rider at the time of engine low rotation. Moreover, when the throttle opening degree is less than the lower limit, and a sharp increase in the engine rotational speed hardly occurs, the power reduction control is prevented from being executed unnecessarily.

The control precondition further includes a condition that the magnitude of the power transmitted from the engine E to the gear transmission 11 is a predetermined upper limit or less. More specifically, the control precondition includes: a condition that the engine rotational speed is a predetermined upper limit or less; and a condition that the throttle opening degree is a predetermined upper limit or less.

With this, at the time of engine high rotation in which a speed difference δV tends to become large even in the normal speed change operation, the normal speed change operation is prevented from being mistakenly determined as the gear disengagement. Moreover, at the time of the engine high rotation in which meshing force of gears is strong, and the gear disengagement hardly occurs, the power reduction control is prevented from being executed unnecessarily. The above-described conditions included in the control precondition do not have to be essential and may be arbitrarily selected and used.

When the control precondition is satisfied (Yes in Step S1), the condition determiner 31 determines whether or not the detection value of the gear position sensor 23 falls within any of the detection value ranges $V_{B1}$ to $V_{B5}$ and $V_{BN}$ corresponding to the transition regions $B_1$ to $B_5$ and $B_N$ (Step S2). When the detection value of the gear position sensor 23 does not fall within any of the detection value ranges $V_{B1}$ to $V_{B5}$ and $V_{BN}$ (transition regions $B_1$ to $B_5$ and $B_N$) (No in Step S2), the control device 12 returns to Step S1. When the detection value of the gear position sensor 23 falls within any of the detection value ranges $V_{B1}$ to $V_{B5}$ and $V_{BN}$ (transition regions $B_1$ to $B_5$ and $B_N$) (Yes in Step S2), the control device 12 determines whether or not the speed difference δV is a threshold TH or more (Step S3). The speed difference δV is a value ($=V_I-V_O$) obtained by subtracting a rotational speed $V_O$ of the output shaft 16 from a rotational speed $V_I$ of the input shaft 15.

The rotational speed $V_I$ of the input shaft 15 is obtained by multiplying the engine rotational speed detected by the engine rotational frequency sensor 24 by a speed ratio (reduction ratio) of the power transmitting path from the engine E to the input shaft 15. The rotational speed $V_O$ of the output shaft 16 is obtained by multiplying the rotational speed of the rear wheel 4 detected by the rear wheel vehicle speed sensor 25 by a speed ratio of the power transmitting path from the rear wheel 4 to the output shaft 16. Each of the rotational speed $V_I$ of the input shaft 15 and the rotational speed $V_O$ of the output shaft 16 may be directly detected by a sensor.

The condition determiner 31 sets the threshold TH such that the threshold TH increases as the rotational speed of the engine E decreases. To be specific, shock generated by reengagement performed after the occurrence of the gear disengagement is smaller in the engine low-speed range than in the engine high-speed range. Therefore, by setting the power reduction control such that the power reduction control hardly starts in the engine low-speed range, the power reduction control is prevented from being executed unnecessarily.

When the speed difference δV is not the threshold TH or more (No in Step S3), the control device 12 returns to Step S1. When the speed difference δV is the threshold TH or more (Yes in Step S3), it is determined that the start condition is satisfied, and therefore, the power reduction control is started (Step S4). To be specific, Steps S1 to S3 are steps of determining whether or not the gear disengagement in which the dog gears 17b to 17d are disengaged from the gears 17a has occurred after a speed change step is terminated. Step S4 is a step of reducing the power transmitted from the engine E to the gear transmission 11.

As described above, when it is determined that the gear disengagement has occurred, the power reduction control is executed. Therefore, the speed difference δV between the rotational speed $V_I$ of the input shaft 15 and the rotational speed $V_O$ of the output shaft 16 in the gear transmission 11 is prevented from becoming excessive. Therefore, the shock generated by the reengagement performed after the gear disengagement has unintentionally occurred is reduced.

Next, the condition determiner 31 determines whether or not the termination condition is satisfied during the execution of the power reduction control (Step S5). The termination condition includes a condition that an absolute value of the speed difference δV is a predetermined value or less. The predetermined value is preferably 300 to 2,000 rpm, more preferably 500 to 1,500 rpm (for example, 1,000 rpm). When this condition is satisfied, the feeling of the rider is prevented from deteriorating even after the power reduction control is terminated.

The termination condition further includes a condition that the detection value of the gear position sensor 23 falls within any of the engagement regions $A_1$ and $A_6$. With this, since the power reduction control is terminated after the completion of the reengagement performed after the gear disengagement has occurred, the shock generated by the reengagement performed after the occurrence of the gear disengagement is surely prevented. The above two conditions included in the termination condition do not have to be essential and may be arbitrarily selected and used.

When the termination condition is not satisfied (No in Step S5), the power reduction control is continued. When the termination condition is satisfied (Yes in Step S5), the control device 12 determines whether or not a predetermined delay time has elapsed since the termination condition is satisfied (Step S6). When the delay time has not elapsed (No in Step S6), the control device 12 returns to Step S5. When the delay time has elapsed (Yes in Step S6), the control device 12 terminates the power reduction control (Step S7) and returns to Step S1. Even when the reengagement performed after the occurrence of the gear disengagement is incomplete, and the gear disengagement occurs again, the repetition of the start and termination of the power reduction control in a short period of time is prevented by setting the delay time as above. The delay time does not have to be set, and the power reduction control may be terminated when the termination condition is satisfied.

Embodiment 2

Figure 7:
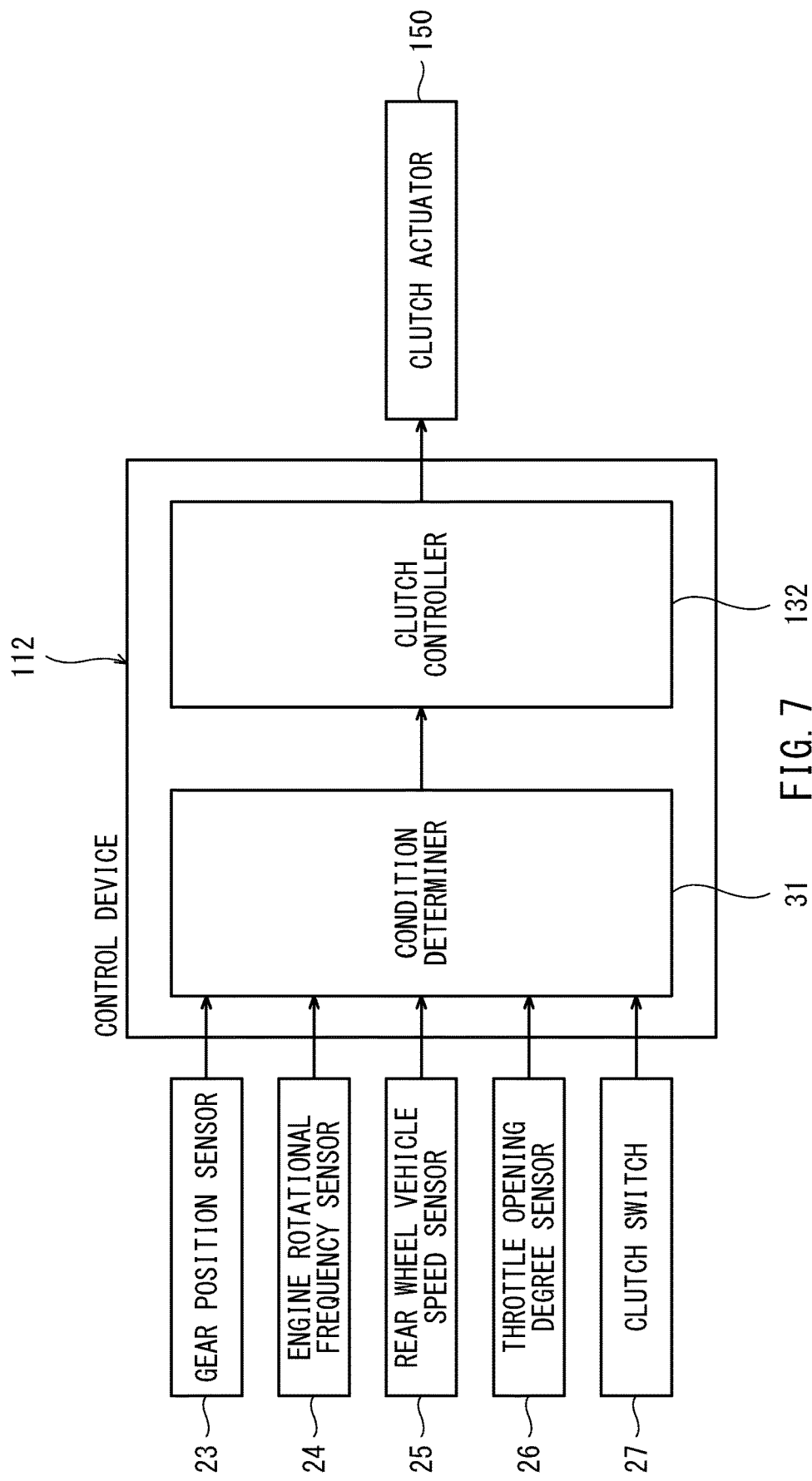
FIG. 7 is a block diagram showing the control device and the like according to Embodiment 2.

FIG. 7 is a block diagram showing a control device 112 and the like according to Embodiment 2. The same reference signs are used for the same components as Embodiment 1, and the repetition of the same explanation is avoided. As shown in FIG. 7, the control device 112 includes the condition determiner 31 and a clutch controller 132 (power controller). A clutch actuator 150 is electrically connected to an output side of the control device 112. The clutch actuator 150 operates the main clutch C (see FIG. 2).

When the condition determiner 31 determines that the start condition of the power reduction control is satisfied, the clutch controller 132 controls the clutch actuator 150 such that the power transmitting ratio of the main clutch C decreases. To be specific, as the power reduction control, the clutch controller 132 controls the clutch actuator 150 such that the main clutch C changes from a completely engaged state to a half-engaged state. With this, the power reduction control of reducing the power transmitted from the engine E to the gear transmission 11 is realized. Since the other components are the same as those described in Embodiment 1, explanations thereof are omitted.

A processor may include, for example, a CPU (central processing unit). A system memory may include a RAM. A storage memory may include a hard disk and/or a flash memory. The storage memory stores programs. One example of a processing circuit is a configuration in which the program read by the system memory is executed by the processor.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

As above, the embodiments have been described as examples of the technology disclosed in the present application. However, the technology in the present disclosure is not limited to those and is also applicable to embodiments in which modifications, replacements, additions, omissions and the like are suitably made. Moreover, a new embodiment may be prepared by combining the components described in the above embodiments. For example, some of components or methods in an embodiment may be applied to another embodiment, and some of components in an embodiment may be separated and arbitrarily extracted from the other components in the embodiment. Furthermore, the components shown in the attached drawings and the detailed explanations include not only components essential to solve the problems but also components for exemplifying the above technology and not essential to solve the problems.

What is claimed is:

1. A method of controlling a gear transmission-equipped vehicle, the gear transmission-equipped vehicle including a driving source and a gear transmission that switches an engagement state of an engaging member to switch a change gear ratio of the driving source, the engaging member being engaged with a gear,
the method comprising:
determining whether or not unintentional gear disengagement has occurred after a speed change step is terminated, the gear disengagement being a state where the engaging member is disengaged from the gear; and
when it is determined that the gear disengagement has occurred, reducing power transmitted between the driving source and the gear transmission.

2. The method according to claim 1, wherein determining whether or not unintentional gear disengagement has occurred includes determining that a current gear position of the gear transmission falls within a transition region between engagement regions corresponding to respective gear positions.

3. The method according to claim 1, wherein reducing the power includes reducing an output of the driving source.

4. The method according to claim 1, wherein the gear transmission-equipped vehicle comprises a clutch interposed between the driving source and the gear transmission, and a clutch actuator that operates the clutch; and
reducing the power includes controlling the clutch actuator such that a power transmitting ratio of the clutch decreases.

5. The method according to claim 1, further comprising:
determining whether or not a termination condition is satisfied, the termination condition being a condition that a speed difference obtained by subtracting a rotational speed of an output shaft of the gear transmission from a rotational speed of an input shaft of the gear transmission is a predetermined value or less; and
terminating reducing the power when the termination condition is satisfied.

6. The method according to claim 1, further comprising:
determining whether or not a termination condition is satisfied, the termination condition being a condition that a current gear position of the gear transmission falls within any of engagement regions corresponding to respective gear positions; and
terminating reducing the power when the termination condition is satisfied.

7. A control device of a gear transmission-equipped vehicle, the gear transmission-equipped vehicle including a driving source and a gear transmission that switches an engagement state of an engaging member to switch a change gear ratio of the driving source, the engaging member being engaged with a gear,
the control device comprising processing circuitry configured to:
determine whether or not unintentional gear disengagement has occurred after a speed change step is terminated, the gear disengagement being a state where the engaging member is disengaged from the gear; and
when it is determined that the gear disengagement has occurred, reduce power transmitted between the driving source and the gear transmission.

8. The control device according to claim 7, wherein determining whether or not unintentional gear disengagement has occurred includes determining that a current gear position of the gear transmission falls within a transition region between engagement regions corresponding to respective gear positions.

9. The control device according to claim 7, wherein reducing the power includes reducing an output of the driving source.

10. The control device according to claim 7, wherein the gear transmission-equipped vehicle comprises a clutch interposed between the driving source and the gear transmission, and a clutch actuator that operates the clutch; and
reducing the power includes controlling the clutch actuator such that a power transmitting ratio of the clutch decreases.

11. The control device according to claim 7, wherein the processing circuitry is further configured to:

determine whether or not a termination condition is satisfied, the termination condition being a condition that a speed difference obtained by subtracting a rotational speed of an output shaft of the gear transmission from a rotational speed of an input shaft of the gear transmission is a predetermined value or less; and terminate reducing the power when the termination condition is satisfied.

12. The control device according to claim 7, wherein the processing circuitry is further configured to:

determine whether or not a termination condition is satisfied, the termination condition being a condition that a current gear position of the gear transmission falls within any of engagement regions corresponding to respective gear positions; and terminate reducing the power when the termination condition is satisfied.

\* \* \* \* \*